United States Patent [19]
McKenzie

[11] Patent Number: 5,632,114
[45] Date of Patent: May 27, 1997

[54] FISH OR CRUSTACEAN TRAP

[75] Inventor: Alan N. McKenzie, Beaconsfield, Australia

[73] Assignee: McKenzie's Fishing Co Pty Ltd., Tasmania, Australia

[21] Appl. No.: 571,264

[22] Filed: Dec. 12, 1995

[30] Foreign Application Priority Data

Dec. 16, 1994 [AU] Australia ................. PN0096

[51] Int. Cl.⁶ .................................. A01K 69/10
[52] U.S. Cl. ......................................... 43/105
[58] Field of Search ................. 43/105, 100, 102, 43/103

[56] References Cited

U.S. PATENT DOCUMENTS

| | | | |
|---|---|---|---|
| 2,769,274 | 11/1956 | Ougland | 43/105 |
| 2,801,126 | 7/1957 | White et al. | 294/71 |
| 2,910,801 | 11/1959 | Safarik et al. | 43/105 |
| 4,554,759 | 11/1985 | Edling et al. | 43/100 |
| 4,565,027 | 1/1986 | Sato | 43/102 |
| 4,604,823 | 8/1986 | Ponzo | 43/105 |
| 4,864,770 | 9/1989 | Serio | 43/105 |
| 5,199,211 | 4/1993 | McKenzie | 43/105 |
| 5,353,541 | 10/1994 | Jonason et al. | 43/105 |

*Primary Examiner*—Jeanne Elpel
*Attorney, Agent, or Firm*—Leonard Bloom

[57] ABSTRACT

A collapsible fish or crustacean trap comprising a framework enclosed by a net. The framework having top and bottom portions spaced by supports pivotally mounted on one and engaging abutments on the other.

16 Claims, 1 Drawing Sheet

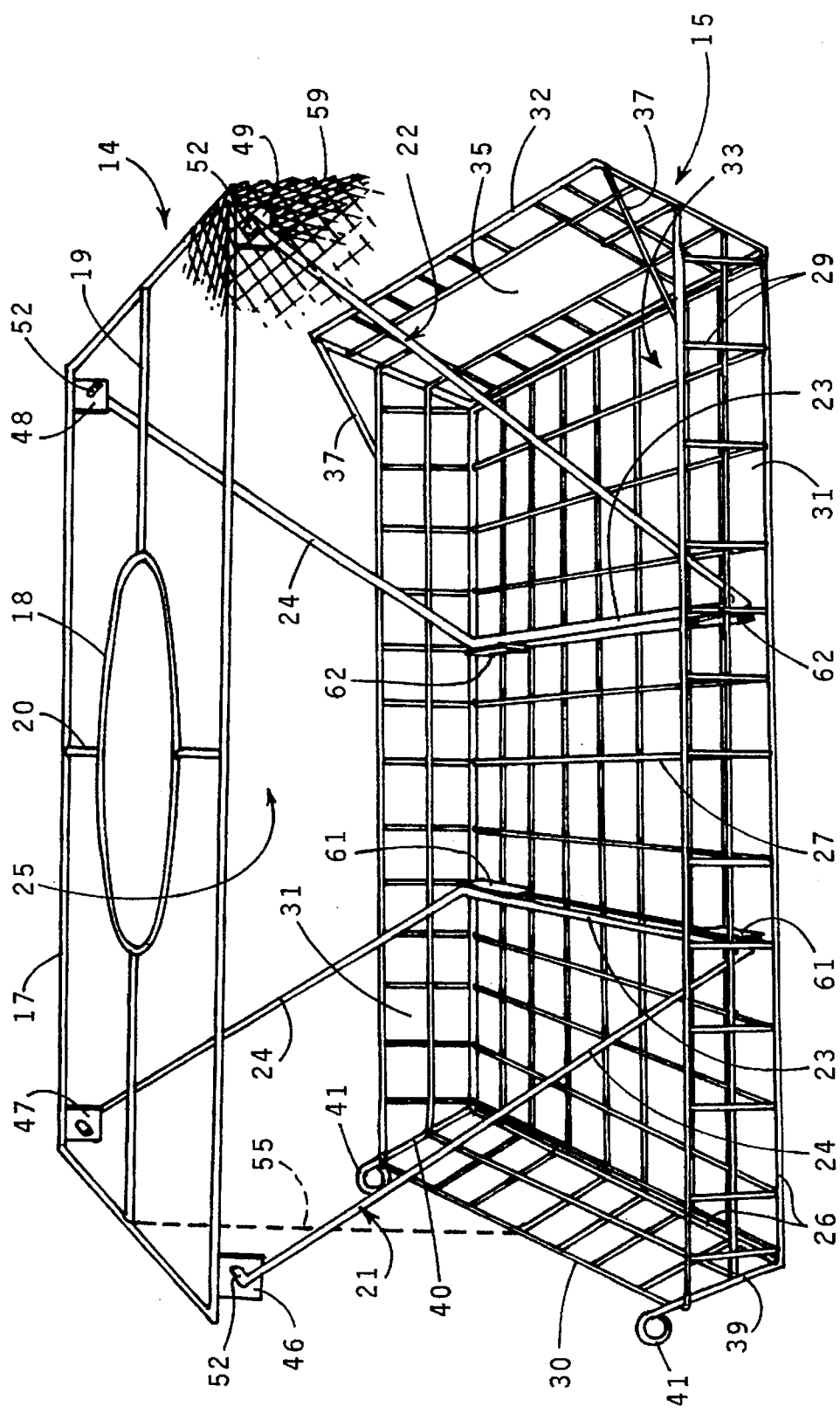

FISH OR CRUSTACEAN TRAP

This invention relates to a collapsible, fish or crustacean trap particularly for use in commercial fishing operations.

In the past it has been known to provide fish and crustacean traps having a mesh enclosure defining a cage and a generally frusto-conical funnel shaped mouth in the top through which the fish or crustacean enters the trap but which prevents the fish or crustacean from leaving the trap after entering. One particular problem with these known traps is that they occupy a very large volume of space when stowed on the deck of a fishing boat preparatory to use or after retrieval from the sea bed. Problems with foldable traps include the difficulty of erecting the traps easily, inability of some foldable traps to withstand rough handling, and inability to store the collapsed traps in a compact stack.

One particular problem of foldable traps which have a fixed base and a foldable upper structure is that the upper structure when folded extends beyond the size of the base. This makes it particularly difficult to stack a plurality of traps in a limited space and in a series of rows close to each other. Also the protruding parts are likely to be damaged or cause damage to nearby goods or to people walking past.

Another problem is that often the foldable upper structure needs to be disassembled, by unbolting connecting parts or the like before the upper structure is able to be folded. Some other known foldable traps have a plurality of movable support frames extending from a base so that a net or the like can be extended around the base and the ends of the arms. This type of structure of trap results in a high torque on the ends of the frames that can weaken the frames and cause breakage of the frames or the connection of the frames with the base.

It is therefore desirable to provide a fish or crustacean trap which overcomes or ameliorates one or more of the disadvantages known fish or crustacean traps.

It is further desirable in one preferred embodiment to provide a fish or crustacean trap which is able to be easily collapsed and fold within itself.

According to the present invention there is provided a collapsible fish or crustacean trap comprising first and second side members, each defining one face of the trap, and a plurality of supports mounted on and extending from one or both of the side members. The side members and supports are selectively positionable such that in an erected condition of the trap each support extends from one side member and is engageable with the other side member to form a trap defining an internal trap volume, and in a collapsed condition of the trap, are positionable to define a storage position with a minimum trap volume.

The first and second side members may form opposing faces of the trap, such as the top and bottom, with the supports being pivotally mounted on one or other of the top and bottom. Preferably the supports are mounted on only one of the first and second side members and extend and are engageable with the other side member.

In a preferred configuration of a collapsible fish or crustacean trap the supports could extend from near opposite ends of one side member and be positionable to converge and engage the other side member.

Also each of the supports can be sized such that when pivoted to a position co-extending with the side member to which it is attached, each support lies within the perimeter of the side member.

The supports may be substantially U-shaped arm members having a first end and opposite end with first ends of the U-shape arm members being pivotally mounted on one side member and the opposite end being an intermediate flat portion of the U-shape arm member being engageable with abutment means located on the other side member Another form of the invention provides a collapsible fish or crustacean trap comprising a bottom, a top and a plurality of supports, each of the supports having a first end and an opposite end, each support being mounted at its first end to either the top or bottom and being engageable at its opposite end thereof with an abutment means provided by the other of the top and bottom, each support being movable pivotally to lie substantially flat against the respective one of the top or bottom to which it is mounted when the trap is collapsed whereby each support is able to pivotally move relative to the top or bottom to which it is mounted, and to engage the abutment means such that the top is spaced by the supports at a predetermined distance away from the bottom when the trap is erected.

The plurality of the supports may be positionable at an angle to the top and bottom to provide a stable support of the top. The shape formed within the supports and the top and bottom may be a trapezium. The supports may comprise frames or mesh with open sections to allow water to flow therethrough.

In order that the invention is more readily understood, a particular embodiment thereof will now be described by way of example only with reference to the accompanying drawing wherein:

FIG. 1 is a perspective side elevation of a fish or crustacean trap in accordance with one embodiment of the present invention.

Although a fish or crustacean trap in accordance with the invention may be a fully self contained trap with the top, bottom and sides of the trap being constructed to prevent escape of fish or crustaceans caught within the trap, the preferred embodiment as shown in the drawings comprises a framework for a fish or crustacean trap around which a net is fitted. The framework comprises side members 14, 15 defining the top 14 and bottom 15 of the trap, and a plurality of supports 21, 22 pivotally mounted on the top 14 and engageable with the bottom 15 to maintain the top 14 and bottom 15 a predetermined distance apart and to define an internal trap volume 25 between the top 14 and bottom 15.

The top 14 includes a top rectangular frame 17 having a central circular opening 18 to which is attachable a frusto-conical funnel (not shown) forming the trap entrance as known in the industry. The bottom 15 has an open cage-like structure. A net 59 is fitted to the bottom 15 and is extended around the top 14 and supports 21, 22 to form a closed trap except for the circular opening 18 and any other required openings.

The framework therefore includes an open cage-like bottom 15 and a collapsible frame comprising the top 14 and supports 21, 22; the top 14, having the central circular opening 18. In use a net (59) or the like is connectable to the bottom 15 and fitted around the collapsible frame 14, 21, 22 while leaving the opening 18 clear so as to form a trap whereby fish or crustacean can enter the trap through the opening 18 but are unable to exit the trap.

The bottom 15 is constructed of a sturdy rectangular metal frame 26 with a central cross strut 27 bisecting the rectangular metal frame 26 for added strength. A rectangular wire mesh tray 29 formed from a sheet of wire mesh having approximately 10 centimetre square openings integrally forms the floor 33 of the trap, which further has two relatively low sides 31 and two relatively low ends 30 and 32. The tray 24 is welded to the top of the metal frame 26 on the bottom 15 of the trap. The sides 31 and ends 30, 32 are outwardly leaning so as to extend at an obtuse angle to the floor 33. The outwardly leaning sides 31 and ends 30, 32 are welded together at their side edges to form the mesh tray 29. One of the ends 30, 32 is a first end 32 which is higher than the opposite second end 30 and the sides 31 of the mesh tray 29. The first end 32 includes a central rectangular opening 35 of a size required by the relevant fishing authorities to allow under sized fish or crustaceans to escape from the internal trap volume 25. This opening 36 therefore is not covered by the net (59) surrounding the framework. Strength brackets 37 are welded between the outer side edges of the first end 32 and the top of the respective sides 31 of the mesh tray 29 to increase the strength of the sides 31 and the first end 32 of the bottom 15 of the trap. At the opposite second end 30 are two sturdy arms 39 and 40 welded to the two respective corners of the sturdy rectangular frame 26 and extending along the joined edges of the second end 30 and the respective sides 31 of the wire mesh tray 29. The sturdy arms 39, 40 extend above the height of the opposite second end 30 and the sides 31 and at their top ends have loops 41. With this construction the loops 41 are connected directly to the sturdy frame 26 and can take the weight of the bottom 15 and thereby be used to retrieve the trap out of the water when in use.

The collapsible frame 14, 21, 22 has a top rectangular frame 17 which is planar and defines the top side of the trap. The top rectangular frame 17 has a central circular opening 18 which supports a plastic trap entrance fitting (not shown) as known in the industry. Strut members 19, 20 extend from the middle of the sides of the top rectangular frame 17 to position the circular opening 18 centrally. Small mounting lugs 46, 47, 48, 49 are welded to the sides of the top rectangular frame 17 and extend orthogonally to the plane of the top rectangular frame 17. The mounting lugs 46, 47, 48, 49 are opposingly positioned in pairs on opposite sides of the top rectangular frame 17 so that they are facing each other. One mounting lug 46 of a pair of mounting lugs 46, 47 is mounted on one side of the top rectangular frame 17 near to a first end and extends downwardly from top rectangular frame 17. The other mounting lug 47 of the pair of mounting lugs 46, 47 is mounted at a respectively similar position on the opposite side of the rectacgular frame 17 near to the first end and extends downwardly in a plane parallel to the plane of the first mounting lug 46 of the pair of mounting lugs 46, 47. The other pair of pounting lugs 48, 49 are also mounted on the sides of the top rectangular frame 17 extending downwardly but at a symmetrical position to the first pair, near the second end of the top rectangular frame 17. The other pair of mounting lugs 48, 49 extends in the same respective planes as the first pair of mounting lugs.

The supports 21, 22 of the collapsible frame 14, 21, 22, comprise two substantially identical U-shaped arm members 21, 22 which have first ends 52 mounted on respective pairs of the mounting lugs 46, 47, 48, 49. Each first end 52 of the U-shaped arm members 21, 22 is an inwardly facing pivot pin, which is mounted in the mounting lugs 46, 47, 48, 49 to allow for pivotal movement of the U-shaped arm members 21, 22. One first end 52 of one of the U-shaped arm members 21, 22 is mounted on one of the mounting lug 46, 47, 48, 49 and a downward leg portion 24 of the U-shaped support frame extends away in a straight line from the respective mounting lug with an intermediate flat portion 23 forming a second end of the U-shape arm member and being orthogonal to the downward leg portion 24 and extending to the other downward leg portion 24 which extends orthogonally to the other of the pair of mounting lugs 46, 47, 48, 49 fixed on the side of the frame member 17 opposite the first mounting lug 46, 47, 48, 49. The pivot pin of the first end 52 on the top of the other downward leg portion 24 allows for mounting on the other of the pair of mounting lugs. Each U-shaped arm member 21, 22 is able thereby to pivot around an axis extending through respective pairs of mounting lugs 46, 47, 48, 49 and parallel to the end of the top rectangular frame 17.

The size of the collapsible frame 14, 21, 22 and its parts are such that the top rectangular frame 17 and U-shaped arm members 21, 22 when in a collapsed condition, fit within the bottom of the trap 15. Since the sides 31 and ends 30, 32 of the bottom 15 extend outwardly, the collapsible frame 14, 21, 22 is still able to fit within the bottom 15 even with the top rectangular frame 17 being the same size as the sturdy rectangular metal frame 26 of the bottom 15. The U-shaped arm members 21, 22 have a width about the same as the width of the top rectangular frame 17 and the downward leg portion 24 has a length that is less than the distance between a respective mounting lug 46, 47, 48, 49 to which each U-shaped arm member 21, 22 is mounted, and the respective furthest end of the rectangular frame 26. The intermediate flat portion 23 of the U-shape arm members 21, 22 have substantially the same size as the width of the bottom 15. Therefore by pivotally moving the supports 21, 22 mounted on the mounting lugs 46, 47, 48, 49 to a flat position alongside the top rectangular frame 17 wherein the supports 21, 22 are in a plane substantially parallel to the plane of the top rectangular frame 17, the collapsible frame 14, 21, 22 is able to fit within the bottom 15 of the trap. The bottom 15 further includes two pairs of abutment means 61 and 62 which are welded to the wire mesh tray 29 in symmetrically opposed positions relative to the central cross strut 27 extending between the two sides of the sturdy rectangular frame 26. Each pair of abutments 61, 62 is positioned in a line and near either side of the frame 26. The two lines are symmetrically positioned on either side of the central cross strut 27 and closer to the cross strut 27 than the ends of the frame 26.

In use, to place the fish or crustacean trap in a erect position, the collapsible frame 14, 21, 22 is lifted above the bottom 15 and orientated so that the sides of the top rectangular frame 17 are aligned with the sides of the sturdy rectangular frame 26 of the bottom 15 with the intermediate flat portion 23 of the U-shaped arm members 21 and 22 extending between the sides. The U-shaped arm members 21, 22 in an erected condition are pivotally moved inwards so that they form an acute angle with the plane of the top rectangular frame 17, and abut the abutment means 61, 62 on the bottom 15. The arm members 21, 22 are therefore outwardly angled relative to the bottom 15 such that the supports 21, 22 and the top rectangular frame 17 and bottom 15 form a trapezium shape that provides a stable support of the top 14. The inward forces provided by the ends of the supports 21, 22 engaging the bottom 15 under the weight of the top rectangular frame 17 which is tending to collapse the collapsible frame 14, 21, 22, is counteracted by reaction forces provided by the abutment means 61, 62. This counteraction of forces provides a solid structure which is further strengthened when a net (59) or the like surrounds and is attached to the framework of the trap. Due to the symmetry of the mounting of the substantially identical U-shaped arm members 21, 22 and the symmetry of the positioning of the abutment means 61, 62 the top rectangular frame 17 is supported parallel to the sturdy rectangular frame 26 of the bottom 15. In use a resilient strap 55 may be used to extend between the top rectangular frame 17 and the bottom 15 to further draw the two towards each other, the engagement of the U-shaped arm members 21, 22 with the abutment means 61, 62 provide a counteracting force to the resilient force and thereby provide a rigid structure. A fish net (59) or the like may be fitted around the erected structure but leaving the central opening 18 and the rectangular opening 36 clear. Alternatively the net (59) may remain in place so that the net (59) which forms the four walls when the trap is erected crumples when the trap is collapsed and is stored together with the collapsed trap 14, 15, 21, 22.

It should be evident from the preceding description that the preferred embodiment of the present invention provides an improved collapsible fish or crustacean trap which avoids disadvantages of the prior art. Of course many modifications to the above described embodiment may be incorporated. For example, the U-shaped arm members 21, 22 may be mounted on the top rectangular frame 17 at a position closer to the middle. The U-shaped arm members 21, 22 could then extend at an angle outwardly, relative to the top rectangular frame 17, and engage abutment means located near the ends of the bottom 15. Also the supports may be mounted on the bottom 15 and engage abutment means on the top 14. Instead of frames, the top and/or bottom and/or supports could be solid structures or the supports could be struts. In another variation of the invention the abutment means may comprise U-shaped clips or the like which may retain the supports therein but can be easily disengaged.

I claim:

1. A collapsible fish, or crustacean trap comprising:

first and second rigid members defining opposing faces of the trap and able to support flexible mesh extending between respective perimeters of the rigid members to form the sides of the trap; and a plurality of supports each mounted on and able to extend from one other of said rigid members to relatively space the rigid members;

wherein the rigid members and supports are selectively positionable in an erected condition or a collapsed position such that in the erected condition of the trap each support extends from the rigid member on which it is mounted and is releasably engageable with the other rigid member to form a trap having an internal trap volume, and in the collapsed condition of the trap, are positionable to define in a storage position with a smaller internal trap volume such that the first rigid member and the supports lie adjacent and substantially within the perimeter of the second rigid member.

2. A collapsible, fish or crustacean trap as defined in claim 1, wherein the supports are pivotally mounted on one or other of the first and second rigid members.

3. A collapsible, fish or crustacean trap as defined in claim 2, wherein all of the plurality of supports are mounted on only one of said rigid members and extend and are engageable with the other rigid member.

4. A collapsible, fish or crustacean trap as defined in claim 3, wherein the supports extend from near opposite ends of one rigid member and are positionable to converge and engage the other rigid member.

5. A collapsible fish or crustacean trap as defined in claim 2, wherein each of the supports is a substantially U-shaped arm member having first and second end and an intermediate portion with first and second end of the U-shape arm member being pivotally mounted on one rigid member and the intermediate portion of the U-shape arm member being engageable with abutment means located on the other rigid member.

6. A collapsible fish or crustacean trap as defined in claim 5 wherein the rigid members have open sections through which water can flow.

7. A collapsible fish or crustacean trap as defined in claim 6 wherein a rigid member includes a mesh.

8. A collapsible fish or crustacean trap as defined in claim 2 wherein the rigid members and supports define a frame of the trap and the flexible mesh can be positioned substantially around the frame to form a closed trap with at least one opening.

9. A collapsible fish or crustacean trap comprising a rigid bottom a rigid top and a plurality of rigid supports which together are able to support a flexible mesh forming at least the sides of the trap, each of said supports having a first end and an opposite end of each support being mounted at its first end to either the top or bottom and being engageable at its opposite end thereof with an abutment means provided by the other of said top and bottom, all of the supports are either all inwardly angled or all outwardly angled so as to provide a stable support of the top, each support being movable pivotally to lie substantially flat against and within the perimeter of the respective one of said top or bottom to which it is mounted when the trap is collapsed and each support being moveable pivotally relative to the top or bottom to which it is mounted, and to engage the abutment means such that the top is spaced by the supports at a predetermined distance away from the bottom when the trap is erected.

10. A collapsible fish or crustacean trap as defined in claim 9 wherein the shape formed within the supports and the top and bottom is a trapezium.

11. A collapsible fish or crustacean trap as defined in claim 10 wherein the supports comprise open frames to allow water to flow therethrough.

12. A collapsible fish or crustacean trap as defined in claim 11 wherein the top and bottom are open frames.

13. A collapsible fish or crustacean trap as defined in claim 9 wherein the supports are mounted on the top with the abutment means provided on the bottom.

14. A collapsible fish or crustacean trap as defined in claim 13 having an even number of supports symmetrically mounted on the top around a bisecting plane of the top and able to engage abutment means symmetrically positioned around a bisecting plane of the bottom such that the supports are able to support the top at a predetermined distance away from the bottom.

15. A collapsible fish or crustacean trap as defined in claim 14 wherein the top and bottom are substantially rectangular and the supports are substantially U-shaped arm members and are pivotally connected by respective first ends to respective sides of the top at positions near the corners of the top.

16. A collapsible fish or crustacean trap as defined in claim 9 wherein the bottom has a rigid rectangular frame with mesh forming a floor of the bottom.

* * * * *